Jan. 30, 1962

G. YEVICK 3,018,657

DEVICE FOR TESTING CIRCUMFERENTIAL WELDS IN PIPE LINES

Filed Dec. 4, 1958

2 Sheets-Sheet 1

INVENTOR.
GEORGE YEVICK
BY Donald G. Dalton
ATTORNEY

INVENTOR.
GEORGE YEVICK
BY Donald G. Dalton
ATTORNEY

United States Patent Office 3,018,657
Patented Jan. 30, 1962

3,018,657
DEVICE FOR TESTING CIRCUMFERENTIAL WELDS IN PIPE LINES
George Yevick, Duquesne, Pa., assignor to United States Steel Corporation
Filed Dec. 4, 1958, Ser. No. 778,140
3 Claims. (Cl. 73—46)

This invention relates to an improved device for testing circumferential welds connecting sections of a large diameter pipe line.

After sections of a large diameter pipe line are welded together, the welds are tested for leaks. Conventional practice is to seal each end of the line or a portion thereof, fill the sealed portion with compressed air, and inspect the welds for leaks by applying soapy water to the outside. This practice requires tremendous volumes of compressed air; a single test may consume all the compressed air which the available equipment can furnish in a full day. When a 60 inch diameter line is tested at 50 p.s.i.g., the bulkheads which furnish the seals must withstand loads of about 140,000 pounds. Hence the practice is hazardous, as well as unduly costly and time-consuming.

An object of the present invention is to provide an improved testing device which enables welds connecting sections of large diameter pipe lines to be tested more economically and rapidly and without hazard.

A further object is to provide a testing device for circumferential welds, which device enables welds to be tested satisfactorily with much smaller volumes of compressed air than required to fill a large diameter line.

A further object is to provide a testing device of the foregoing type which is of simple construction and readily portable, yet eliminates need not only for excessive volumes of compressed air, but also for elaborate bulkheads as seals.

Figure 1:
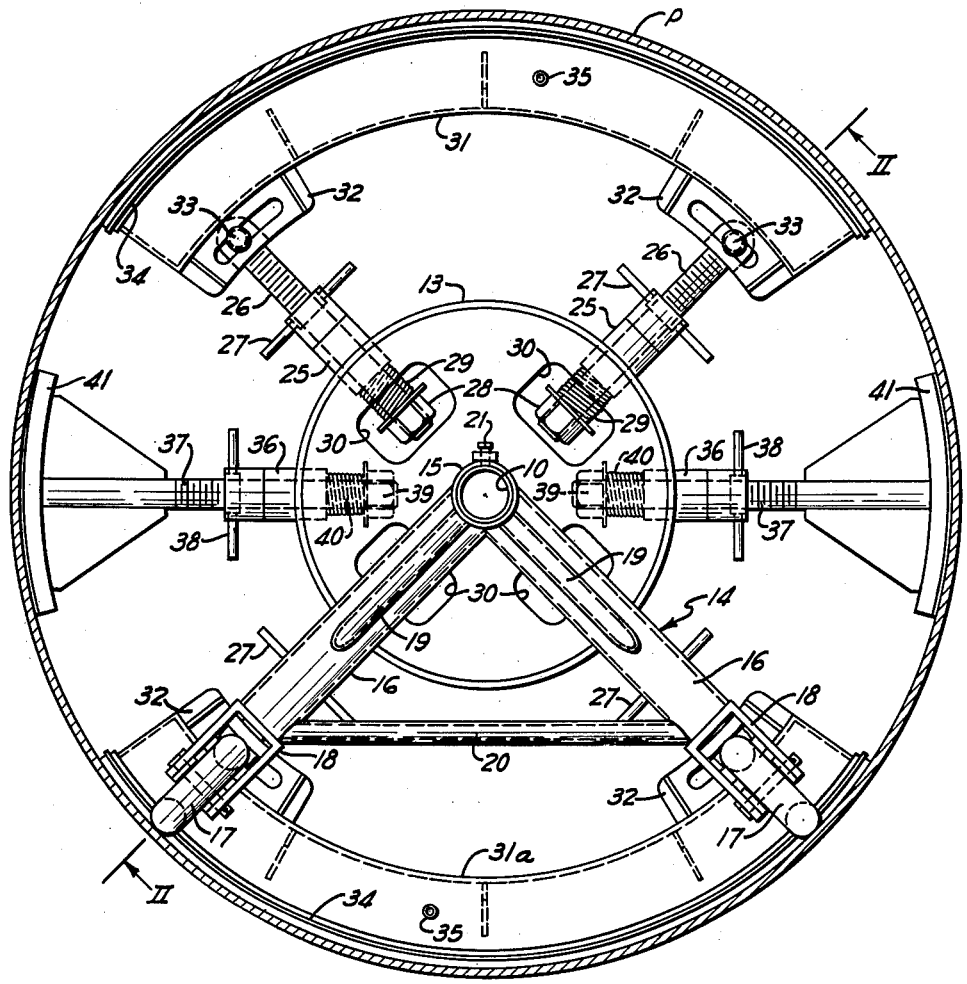
Figure 2:
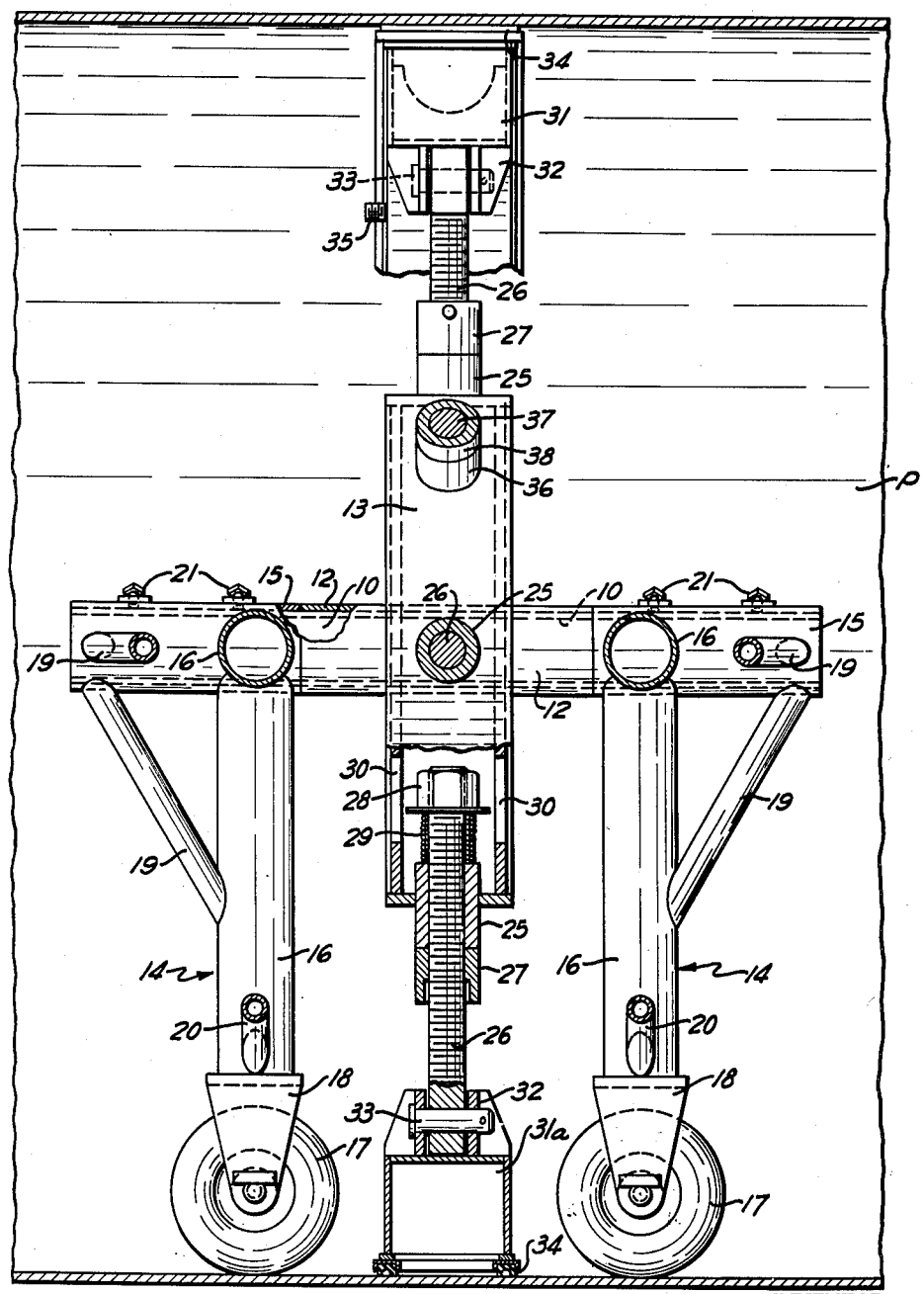

In accomplishing these and other objects of the invention, I have provided improved details of structure, a preferred form of which is shown in the accompanying drawings, in which:

FIGURE 1 is an end elevational view with parts broken away showing my testing device installed in a pipe line; and FIGURE 2 is a longitudinal section on a larger scale taken generally on line II—II of FIGURE 1, some of the parts being in elevation to clarify the showing.

My testing device includes a central tie-in shaft 10, preferably tubular, a sleeve 12 journaled to the central portion of said shaft, a drum 13 fixed to said sleeve, and a pair of frames 14 mounting said shaft. Each frame 14 has a sleeve 15 receiving one end of the shaft, a pair of angularly related struts 16 extending radially from its sleeve 15, and wheels 17 journaled to fittings 18 at the ends of the struts. Preferably each frame also has a pair of knee braces 19, which extend between the sleeve and the respective struts, and a cross brace 20, which extends between the two struts. Set screws 21 are threadedly engaged with the sleeve 15 of each frame to fix the frames on shaft 10.

Drum 13 carries four radially extending guide tubes 25 spaced 90° apart around its periphery. Adjusting bolts 26 are slidably mounted in the respective guide tubes. Adjusting wheels 27 are threadedly engaged with the respective bolts and bear against the outer ends of the tubes. Nuts 28 are threadedly engaged with the inner ends of the bolts, and compression springs 29 encircle the respective bolts and bear against said nuts and the inner ends of the guide tubes. Thus the springs urge the bolts inwardly to the limit permitted by the adjusting wheels. A side wall of drum 13 contains windows 30 through which the nuts and springs are accessible to enable the parts to be assembled.

An arcuate test tank 31 spans the space between the outer ends of two of the adjusting bolts 26, and an opposed similar tank 31a spans the space between the other two. Each tank has slotted fittings 32 fixed to its inner circumferential face and connected to the ends of bolts 26 by pins 33. The outer faces of the tanks are open, but carry resilient gaskets 34 around their edges. One wall of each tank carries a valve 35 for admitting compressed air to the interior of the tank. The curvature of the tanks matches that of a pipe line P in which the device is to be used, and each tank extends through an arc of about 110°.

Drum 13 also carries two additional radial guide tubes 36 diametrically opposed to each other and situated intermediate two of the first mentioned guide tubes 25. Stabilizer bolts 37 are mounted in the guide tubes 36 and carry adjusting wheels 38, nuts 39 and compression springs 40 structurally similar to corresponding parts mounted in the first mentioned guide tubes. The outer end of each bolt 37 carries an arcuate stabilizer shoe 41 also of a curvature matching that of pipe P.

In operation, the device is wheeled into a pipe line P to a weld which is to be tested. The adjusting wheels 27 and 38 are of course positioned to retract bolts 26 and 37 so that the device is readily portable within the pipe line. When tanks 31 and 31a are aligned with the weld, the adjusting wheels 27 are turned to force the tanks outwardly until their gaskets 34 engage and seal the inside surface of the pipe wall over a portion of the weld. The walls of large diameter pipes tend to sag, but the tanks force the walls into round. The adjusting wheels 38 are turned to force the stabilizer shoes 41 outwardly into engagement with the pipe wall to assist in maintaining the pipe in round as pressure is applied to the tanks. After the device is installed in this fashion, compressed air is admitted to the tanks through their valves 35 and the outside of the welds tested for leaks in the usual fashion. On completion of these operations, the adjusting wheels 27 and 28 are turned to retract tanks 31 and 31a and stabilizer shoes 41. Drum 13 is rotated 90° about shaft 10, and the test is repeated on the remainder of the circumference of the weld.

From the foregoing description, it is seen my invention affords a portable testing device of simple construction. The device greatly facilitates testing welds in a large diameter pipe line, since it eliminates any need to seal the ends of the line or to fill the entire line with compressed air.

While I have shown and described only a single embodiment of my invention, it is apparent that modifications may arise. Therefore, I do not wish to be limited to the disclosure set forth but only by the scope of the appended claims.

I claim:

1. A device for testing circumferential welds connecting sections of a large diameter pipe line whose walls tend to sag out of round comprising a shaft, portable frame means mounting said shaft, support means journaled on said shaft, a pair of opposed arcuate tanks mounted on said support means and having open circumferential faces, sealing means on said tanks around said open faces, arcuate stabilizing means mounted on said support means intermediate said tanks, means for moving said tanks and said stabilizing means on said support means radially with respect to said shaft and thereby forcing said sealing means and said stablizing means into engagement with portions of the inside wall of a pipe line and forcing these portions into round, and means for admitting compressed air into said tanks.

2. A device as defined in claim 1 in which said support means includes a drum, respective pairs of guides mounted on said drum for each tank, adjusting bolts mounted in said guides and connected to said tanks, and in which the means for moving said tanks includes adjusting wheels threadedly engaged with said bolts.

3. A device as defined in claim 2 in which said support means includes an additional opposed pair of guides mounted on said drum intermediate said tanks, and stabilizer bolts mounted in said respective last named guides, and in which said stabilizing means includes arcuate shoes mounted on the ends of said last named bolts.

References Cited in the file of this patent

UNITED STATES PATENTS

| | | |
|---|---|---|
| 1,788,845 | Reynolds | Jan. 13, 1931 |
| 2,481,013 | Henderson | Sept. 6, 1949 |
| 2,766,614 | Cook | Oct. 16, 1956 |

FOREIGN PATENTS

| | | |
|---|---|---|
| 927,492 | Germany | May 9, 1955 |
| 739,158 | Great Britain | Oct. 26, 1955 |